May 10, 1927.

A. N. MERLE 1,628,416

MEANS FOR ATTACHING MOTION PICTURE FILMS TO WINDING CORES

Filed Feb. 14, 1925

André Noël Merle
INVENTOR
By
his ATTORNEY

Patented May 10, 1927.

1,628,416

UNITED STATES PATENT OFFICE.

ANDRÉ NOËL MERLE, OF PARIS, FRANCE, ASSIGNOR TO PATHÉ CINÉMA ANCIENS ETABLISSEMENTS PATHÉ FRÉRES, OF PARIS, FRANCE.

MEANS FOR ATTACHING MOTION-PICTURE FILMS TO WINDING CORES.

Application filed February 14, 1925, Serial No. 9,364, and in France October 25, 1924.

It has been already proposed, for attaching a motion picture film to a winding core, the height whereof is equal to the width of the film, to wind the end of the film upon the core and to clamp this end of the film upon the core by means of a small curved spring which covers somewhat more than half the circumference of the said core. But this method of attaching the film is subject to inconvenience, since the longitudinal axis of the film is not always exactly disposed in the mean transverse plane of the core, so that the film will not always be accurately wound in the said plane of the core.

The present invention relates to an improved method for attaching a motion picture film to a winding core which consists in making the end of the film which is adapted to be attached to said core, narrower than the main part of the film, said end of the film being engaged and clamped in a groove of corresponding width which is formed upon the periphery of the core, whereby the correct winding of the film upon the said core will be ensured.

Due to this arrangement, the narrow end of the film, which is wound in the groove provided on the periphery of the core, is maintained upon said core, so that the longitudinal axis of the film will be situated exactly in the middle plane of the core.

The appended drawing, given by way of example, shows an embodiment of the said invention.

Figure 1:
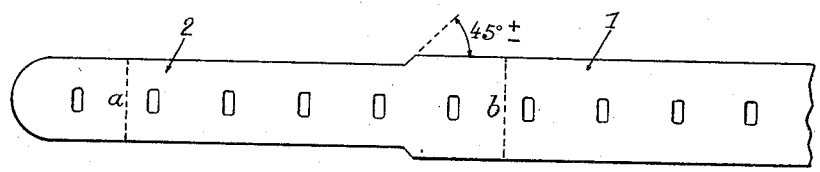
Fig. 1 shows a film whose end portion has a reduced width.
Figure 2:
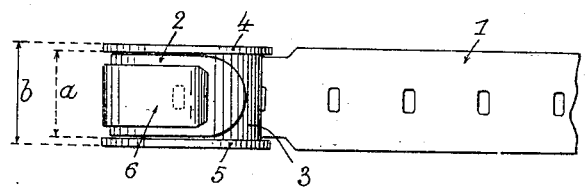
Fig. 2 shows the method of winding and of attaching the end of the said film upon the core.

According to the invention, the film 1 has at its end 2 a width which is less than the width in the main part of the film carrying the images. Fig. 2 shows the said film with its end wound upon the core; this latter comprises a middle part 3 and two flanges 4 and 5 of larger diameter than the said middle part. In other terms the part 3 is a groove formed in the periphery of the core.

The height of the part 3 is equal to the width $a$ of the end of the film, whilst the total height of the core is equal to the width $b$ of the main part of the film. The end portion 2 of the film which is exactly maintained between the flanges 4 and 5 is secured to the body 3 by the spring 6 which covers somewhat more than one-half the circumference of the said main body.

Figure 3:
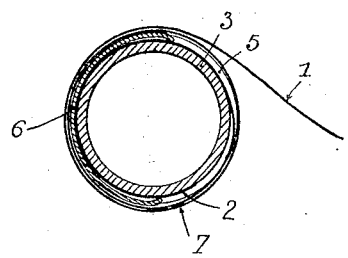
Fig. 3 is a cross section of a core according to the invention, two turns of the film being wound thereon.

It will be observed in Fig. 3 that when the film is wound upon the core, the end portion of the film 2 will come into contact with the body 3 of the core whilst the first turn 7 of the part of the film having the normal width will enter into contact at its edges with the flanges 4 and 5 of the core.

The result which is attained according to the invention consists in the fact that the film is automatically placed in the proper manner upon the said core, thus affording a decided advantage, and chiefly when it is considered that the film is usually attached to the core in the dark room.

In the drawings the invention is shown as applied to the case in which the film comprises a single central row of perforations, but it is obvious that this form of construction is given solely by way of example. The film may be perforated in any suitable manner and the perforations may for example be disposed in two rows along the edges of the film; in this event when the end portion of the film is narrowed, a certain number of the perforations will be cut down or even eliminated but this will offer no inconvenience, since these perforations are not employed for the travel of the film and are only formed in this part by reason of the continuous manufacture of the film.

Having now described my invention, what I claim as new and desire to secure by Letters Patent is:

1. The method of attaching a motion picture film to a winding core which consists in making the end of the film which is adapted to be attached to said core narrower than the main part of the film, providing upon the periphery of the core a groove of the same width as said narrowed end of the film and winding said narrowed end of the film about said groove on the core.

2. Means for winding the film on a core of a motion picture apparatus comprising a core, a film having substantially a width equal to the length of the core, one end of said film adapted to be attached to said core being narrower than the main part of the film, a groove provided upon the periphery of said core and adapted to receive said narrowed end of the film and an arcual spring blade adapted to clamp said narrowed end of the film in said groove.

In testimony whereof I have signed my name to this specification.

ANDRÉ NOËL MERLE.